UNITED STATES PATENT OFFICE.

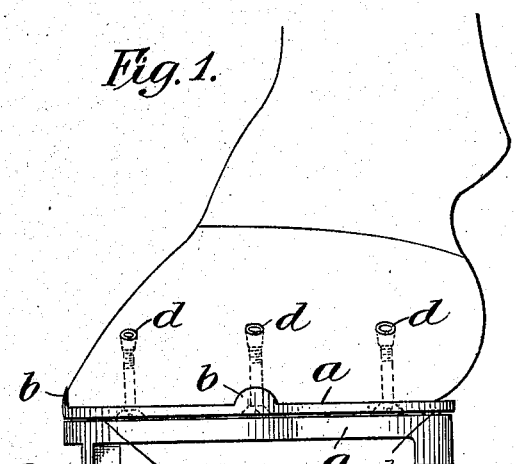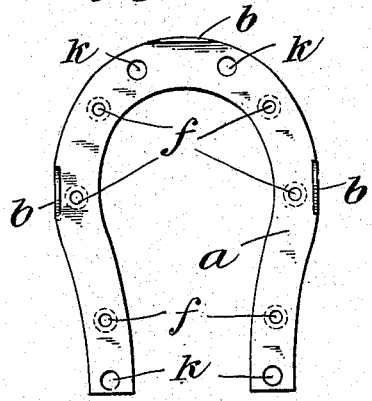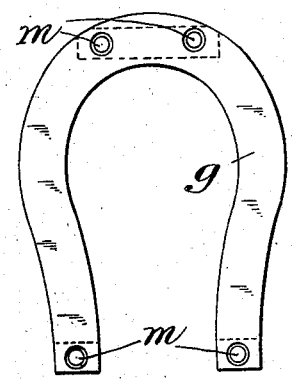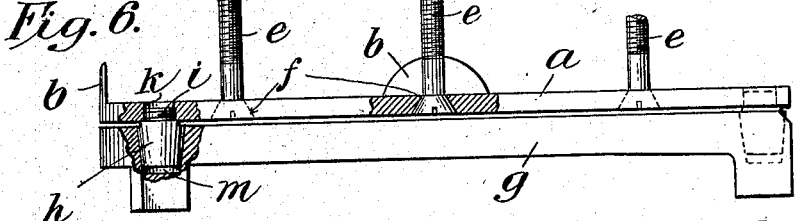

GEORGE L. GILLER, OF NEW YORK, N. Y.

HORSESHOE.

No. 885,238.  Specification of Letters Patent.  Patented April 21, 1908.

Application filed August 6, 1907. Serial No. 387,261.

*To all whom it may concern:*

Be it known that I, GEORGE L. GILLER, a citizen of the United States, residing in the borough of Brooklyn, of the city of New York, State of New York, have invented certain new and useful Improvements in Horseshoes, of which the following is a specification, reference being had to the accompanying drawing, forming a part hereof.

The objects of this invention are to provide a compound horse-shoe comprising one part which is permanently secured to the hoof and another part which takes the wear and may be readily removed and replaced when worn, and also to provide improved means for securing the horse-shoe to the hoof, as well as suitable means for securing together the two members of the compound shoe.

The invention will be more fully explained hereinafter with reference to the accompanying drawing in which it is illustrated, and in which Figure 1 is a view in side elevation showing the improved horse-shoe with the preferred means securing it to the hoof and a hoof in outline. Fig. 2 is a top view of the shoe member which is permanently secured to the hoof. Fig. 3 is a top view of the wear member. Fig. 4 is a detail view of the preferred means for securing the permanent member to the hoof. Fig. 5 shows in side elevation and top view the preferred means for securing the wear member to the permanent member. Fig. 6 is a side view of the shoe on a larger scale than Fig. 1 partly broken out to show details of construction.

The member $a$ of the compound shoe is a light plate, which is adapted to be secured permanently to the hoof, that is, it is not to be removed except when it is necessary to pare the hoof. It may be provided with lugs $b$ to engage the hoof, and while it may be secured by nails in the usual manner, it is preferably secured by the means shown in the drawing. Such means comprise: split sleeve-nuts $d$ which are let into the hoof, as shown in Fig. 1, and screw-bolts $e$, which are inserted through holes $f$ in the member $a$ and through the hoof and engage the sleeve-nuts $d$, the heads being counter sunk in the plate $a$. The holes through the hoof are prepared without difficulty, the plate itself being used as a jig, and as the screw-bolts are driven home they draw the sleeve-nuts firmly into the hoof and moreover as such sleeve-nuts are both split and tapered, the sleeve-nuts are caused to bind firmly on the screw-bolts and hold them from loosening. The sleeve-nuts $d$ are corrugated longitudinally so that they may engage the hoof to be held from turning when the bolts are set up. The wear member $g$ of the compound shoe is formed substantially like an ordinary shoe but may be lighter in weight as it can be removed readily whenever it is worn out.

As the preferred means for securing the wear plate to the permanent member of the shoe, there are provided tapered studs $h$ having threaded shanks $i$ screwed into holes $k$ prepared therefor in the permanent member $a$, which stud may also be provided with a flattened or other polygonal portion $l$ for convenience in removing and replacing the studs. For engagement with the tapered studs $h$ the wear plate $g$ is provided with similar tapered holes $m$. The taper to the studs is slight so that a firm hold is secured when the wear plate or member is applied to the permanent member on the hoof by a few light taps of a hammer. The effect of use of the shoe is, of course, to press the wear plate more firmly into connection with the permanent plate and there is no liability of disengagement. In fact, when it is desired to remove the wear plate it is necessary to insert a thin wedge between the two plates.

The permanent member and the wear plate or plates are made from a common jig so that the studs and the holes in the wear plate register properly when the wear plate is applied.

I claim as my invention.

1. A horse-shoe comprising a plate or member adapted to be secured to the hoof, tapered studs secured to such member, and a wear plate or member having tapered holes to engage said studs with a tight fit and to be secured thereby to the first member.

2. The combination with a horse-shoe, of split tapered nuts adapted to be seated in the hoof, and screw-bolts adapted to pass from the shoe through the hoof into said nuts.

This specification signed and witnessed this 5th day of August, A. D., 1907.

GEORGE L. GILLER.

Signed in the presence of—
W. B. GREELEY,
AMBROSE L. O'SHEA.